(No Model.)
J. C. ANDERSON.
UNDERGROUND CONDUIT.
No. 349,472. Patented Sept. 21, 1886.
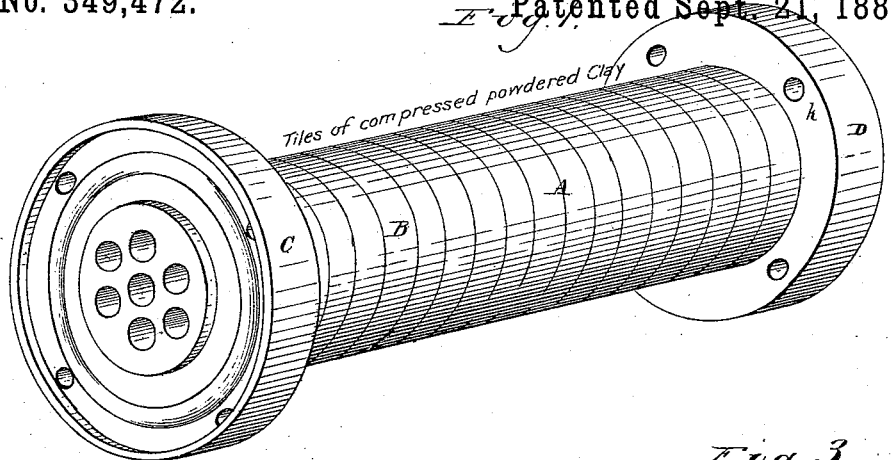
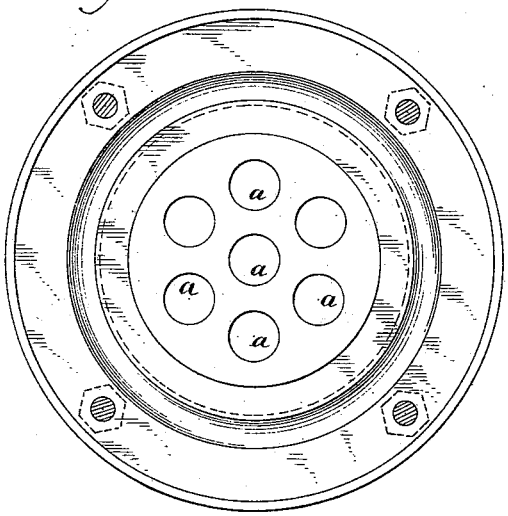
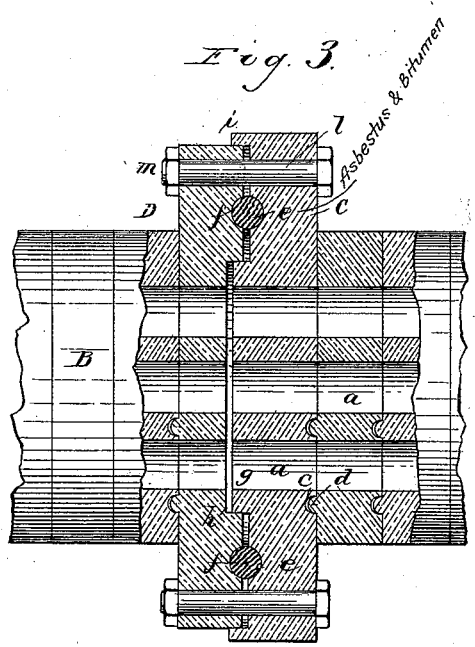
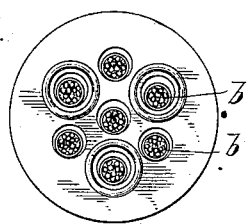
Witnesses.
Henry Frankfurter
Alex Mahon
Inventor.
J. C. Anderson
By L. H. Tinsabaugh

UNITED STATES PATENT OFFICE.

JAMES C. ANDERSON, OF HIGHLAND PARK, ILLINOIS.

UNDERGROUND CONDUIT.

SPECIFICATION forming part of Letters Patent No. 349,472, dated September 21, 1886.

Application filed March 19, 1886. Serial No. 195,877. (No model.)

*To all whom it may concern:*

Be it known that I, JAMES C. ANDERSON, a citizen of the United States, risiding at Highland Park, in the county of Lake and State of Illinois, have invented certain new and useful Improvements in the Manufacture and Construction of Underground Conduits for Electrical Wires from Clay; and I do hereby declare the following to be a full, clear, and exact description of the invention, such as will enable others skilled in the art to which it appertains to make and use the same.

My invention relates to improvements in the manufacture and structure of underground conduits for electrical wires or cables.

The object of my invention is to provide a conduit for telegraph wires or cables which will be solid throughout, free from warpage, not liable to be broken, and which will be a complete and perfect insulator.

My invention consists of the method hereinafter described of manufacturing underground conduits for telegraph-wires or electrical cables, which consists in making the sections of a series of thin perforated disks of dry claypowder under great pressure, and joining said disks to form sections of convenient length for handling in any suitable manner, so as to render the joints impervious to moisture, and form a complete insulation of the wires or cables.

Referring to the drawings, Figure 1 is a view in perspective of a section of the conduit made of smaller sections or tiles. Fig. 2 is an end view of the same, showing the flanged end section. Fig. 3 is a view, partly in section, showing the connections between two adjacent sections. Fig. 4 is a sectional end view taken through one of the sections and showing the wires or cables located therein. Fig. 5 is a perspective view of the small tiles or tube-sections.

It is a well-known fact that dry clay cannot be compressed in large bodies to a great degree of density; but when pressed in small quantities into thin or comparatively thin articles an exceeding high degree of density and strength is imparted to them, so that the article is not liable to be affected by abrasion, even by the hardest steel point, is not easily broken in the handling, and remains practically unaffected by the frost and the contractions and expansions incident to thermal changes.

The ordinary clay or terra-cotta pipes or conduits, as heretofore constructed, have been made by the ordinary processes of working wet or tempered clay, and as a natural consequence such tiles or conduits are very porous, and when buried in the ground these pores are filled with water, owing to the affinity water has for burned clay, which in a great measure destroys the insulating properties of these conduits; and, furthermore, these conduits, when made even in comparatively short sections in the ordinary mud process, are liable to warp in the burning, so as to make an imperfect conduit, and are fragile and liable to be broken in the handling, or become crushed or collapsed by the weight of the earth when buried in the same.

In the drawings, A indicates a section of the conduit, which is made up of a series of thin tiles, B, and the larger tiles C and D, which form the ends by which the sections are joined or coupled together. As already indicated, the tiles or sections which form the conduit are made comparatively thin from dry clay or claypowder under great pressure, which thoroughly compacts or solidifies the clay, so that the size and number of the pores are reduced to the minimum, diminishing the absorptive qualities of the clay, and increasing the insulating properties of the conduit as against the ordinary clay or terra-cotta conduit.

The tiles or slabs B, C, and D are provided with a series of perforations, *a*, of any desired number or size to receive the wires or cables *b*, the partition-walls between the perforations serving to insulate the wires completely, so that the currents of electricity passing through said wires will not be disturbed by induction. The ends of the tile-sections are provided with annular grooves *c*, and similar tongues, *d*, around the perforations, so that the sections can be readily put together in such a manner that the perforations will register and thus form continuous ducts.

The end sections, C and D, are provided with an annular groove or recess, *e*, in which is placed a rope or ring of asbestus fiber, *f*, said rope or ring being thoroughly saturated or impregnated with bituminous, resinous, or other water-proof material which will prevent the water and moisture from entering the interior of the conduit. The section C is provided with an annular projection, g, which enters an annular cavity, h, formed in the section D, which prevents the coal-tar or bituminous matter from percolating or running down into the ducts or perforations a. This is an important feature for the reason that when the conduits are laid in proximity to steam or hot-air pipes the bitumen is liable to melt or become soft and thus find its way into the interior of the conduit, if not prevented. The section C is somewhat larger than the section D, and is provided with an annular projection, i, which fits over the section D and serves to prevent the entrance of water and also prevents the dirt from falling into the joint and thus preserves the flexibility of the joint.

The end sections, C and D, are provided with apertures k, through which the bolts l are passed and secured by nuts m, and by which means the sections A are secured together. The packing-ring f is made somewhat larger than the annular recesses e, so that the joints will be slightly flexible.

In making up the sections A one of the end tiles or sections is placed in the kiln, and the intermediate tiles placed thereon, care being taken to have the holes or perforations match or register, and when the desired length of tube has been reached the other end section is placed thereon. It will of course be understood that a suitable layer or powder of vitrifiable material is placed between each tile as they are being laid up so that when properly burned the tiles will be firmly fused together, and thus form practically a solid section, such as is shown in Fig. 1.

The apertures a in the tiles may be coated with a vitrifiable compound, so that the apertures will be coated with a glassy or vitrified lining which greatly enhances the value of the insulating properties of the conduit. If desired, the tiles may be covered on the outside with a glazing or vitrifiable compound which will make the conduit impervious to water, both inside and out. These sections, when made and joined in the manner described, will be found to have sufficient strength and rigidity to admit of their being suspended in area-ways and in the vaults under the sidewalks. In structures of this kind it is necessary that the material be capable of resisting the action of the frost, and also the action of heat when placed in juxtaposition to steam and hot-air pipes, and it will be found that conduits formed of the material and in the manner described will fill all the requirements and meet all the objections raised to putting the wires underground.

It will be noticed that owing to the close texture of the tiles from which the conduits are made, and the tight joint formed between the sections that even the gases escaping from adjacent mains will not find their way into the conduits, and in this way explosions are obviated. It will also be noticed that the conduits just described are superior to the conduits or insulating devices made from bitumen or bituminous cements, for the reason that when such bituminous conduits are placed in close proximity to steam or hot-air pipes they are liable to melt and expose the wires or cables, and thus destroy the insulation.

Having thus described my invention, what I claim is—

1. The method herein described of making underground conduits for telegraph wires or cables, which consists in making thin perforated disks of dry powdered clay, as described, placing the same together in sections of convenient length in a kiln with a vitrifiable material between the disks, and fusing the same into one body by heat, as set forth.

2. An underground conduit for telegraph-wires, composed of clay disks having numerous perforations joined together by a vitreous material, as set forth.

In testimony whereof I affix my signature in presence of two witnesses.

J. C. ANDERSON.

Witnesses:
  O. A. V. RUNNGREN,
  F. D. EVERETT.